United States Patent [19]

Stroupe

[11] 4,005,234
[45] Jan. 25, 1977

[54] TUBULAR ARTICLE AND METHOD OF MAKING THE SAME

[75] Inventor: James D. Stroupe, Newtown, Pa.

[73] Assignee: Sipler Plastics, Inc., Doylestown, Pa.

[22] Filed: Oct. 10, 1974

[21] Appl. No.: 513,524

Related U.S. Application Data

[62] Division of Ser. No. 402,131, Oct. 1, 1973.

[52] U.S. Cl. .............................. 428/36; 138/127; 138/141; 138/149; 138/DIG. 10; 156/245; 428/195; 428/209; 428/247; 428/253; 428/256; 428/310
[51] Int. Cl.² .......................................... F16L 9/00
[58] Field of Search ................. 161/89, 92, 93, 94, 161/95, 159, 160, 167, 190, 196, 207, 213, 214, DIG. 4; 156/242, 245, 313, 189; 264/314; 138/149, 127, DIG. 2, DIG.10; 428/310, 247, 253, 254, 36, 175, 195, 209, 256

[56] References Cited

UNITED STATES PATENTS 2,858,854   11/1958   Daggett ..................... 138/DIG. 10
3,547,162   12/1970   Schaerer ..................... 138/DIG. 9

*Primary Examiner*—James J. Bell
*Attorney, Agent, or Firm*—Z. T. Wobensmith, 2nd; Z. T. Wobensmith, III

[57] ABSTRACT

Tubular articles and the like and methods of making the same are disclosed, the tubular article being of desired tortuous shape, strong and rigid, free from porosity, light in weight, resistant to high and low temperatures with outerskin layers to improve fluid conveying and storage characteristics for example an exterior metallic foil or mesh lamina or skin of heat reflective and dispersive qualities and suitable for electric resistance heating if desired. The article is formed in a mold with an inflatable mandrel which carries a surrounding knitted fabric resin carrying component and with an exterior lamina or skin which is applied in the mold for subsequent integration in the article by matrix curing.

9 Claims, 9 Drawing Figures

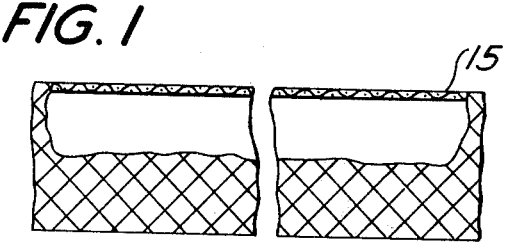
FIG. 1
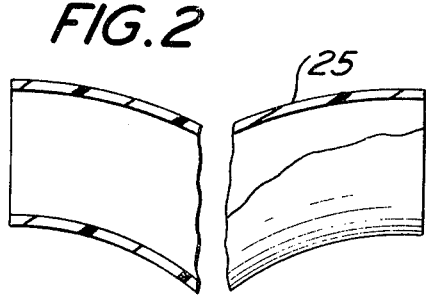
FIG. 2
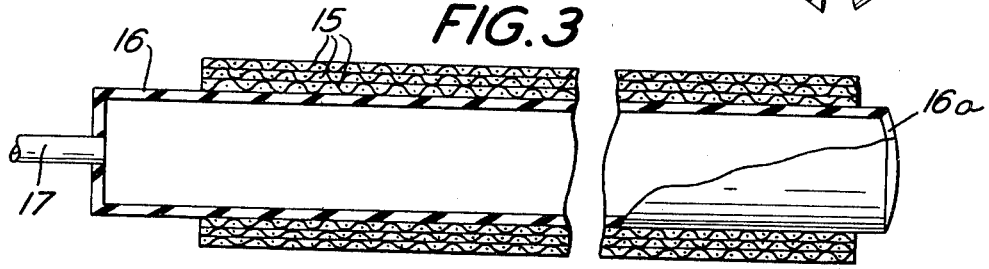
FIG. 3
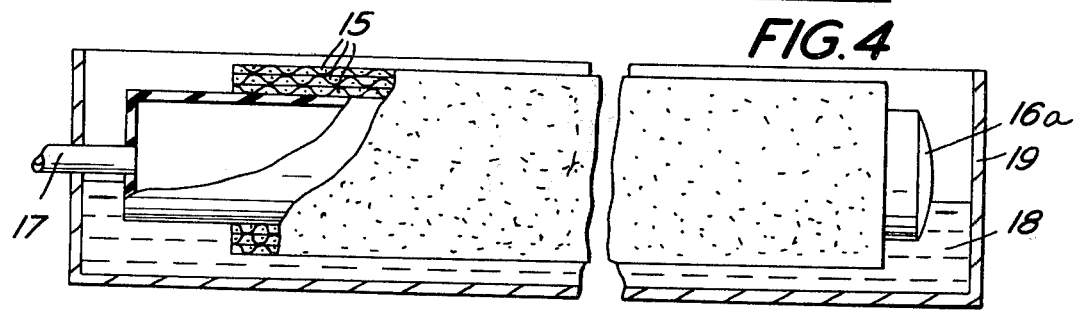
FIG. 4
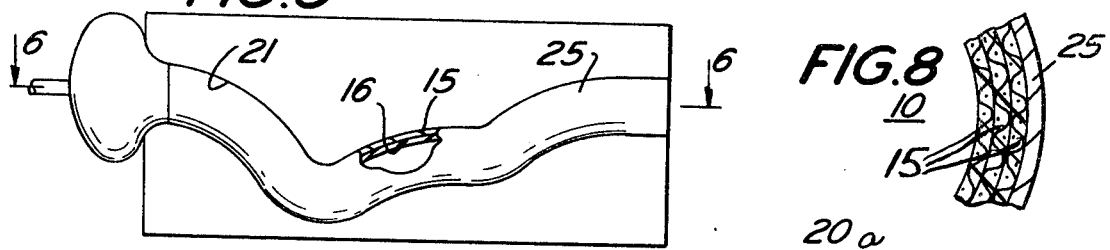
FIG. 5
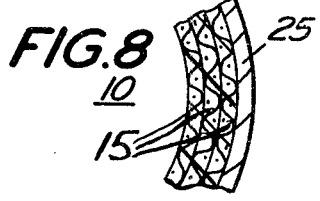
FIG. 8
FIG. 6
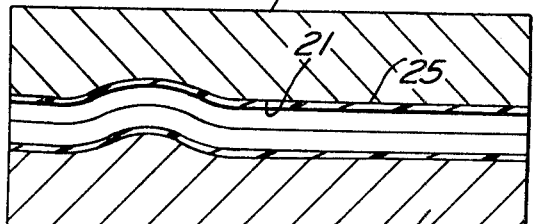
FIG. 7
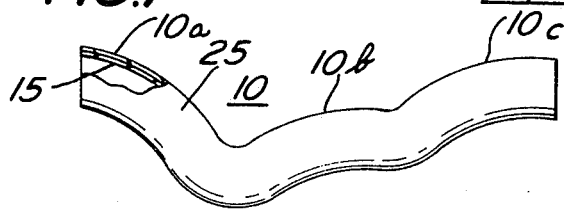
FIG. 9
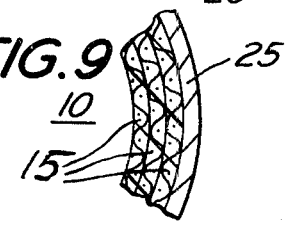

TUBULAR ARTICLE AND METHOD OF MAKING THE SAME

CROSS REFERENCE TO RELATED APPLICATION

This application is a division of application filled Oct. 1, 1973, Ser. No. 402,131.

BACKGROUND OF THE INVENTION

1. Field of the Invention

This invention relates to tubular articles and methods of making the same, and more particularly to such articles suitable for air, gas or liquid flow, under pressure or vacuum, or fluid storage.

2. Description of the Prior Art

It has heretofore been proposed in the Sipler, U.S. Pat. Nos. 2,990,855 and 2,995,781 to provide tubular conduits and methods of making the same which utilize the mechanical interactions between an inflatable mandrel and a surrounding knitted fabric resin carrying component to produce monolithic permanently shaped strong non-porous tube like objects by a low pressure molding operation which is self-stopped by setting of the resin, the fabric being retained in the body of the finished article to contribute to the performance of the finished conduit. Such conduits have been extensively used in the automotive field on trucks for connecting air cleaners to carburetors and for other purposes and are tailored by choice of resin, filler and reinforcement so that each unit volume contributes substantially equally to the performance of the article.

SUMMARY OF THE INVENTION

In accordance with the invention the previously available tubular articles are improved as to the utility and performance by the inclusion in a unitary construction of specialized outer lamina or skins which can be preshaped rather than stretched or expanded, the integration being effected during the molding procedure primarily by the resin matrix. The outer lamina or skins advantageously include metal foil or metal mesh with heat reflective and/or heat conductive properties.

It is the principal object of the invention to provide an improved monolithic permanently shaped strong rigid non-porous tubular object with an exterior lamina or skin which imparts new and heretofore unavailable qualities and characteristics to such object.

It is a further object of the invention to provide improved methods of making tubular objects of the character aforesaid utilizing the mechanical interactions between an inflatable mandrel and a surrounding knitted fabric resin distributing device having an outer lamina of preshaped relatively non-stretchable or non-expansible material in a one shot low pressure molding operation.

Other objects and advantageous features of the invention will be apparent from the description and claims.

BRIEF DESCRIPTION OF THE DRAWINGS

The nature and characteristic features of the invention will be more readily understood from the following description, taken in connection with the accompanying drawings forming part thereof, in which:

FIG. 1 is a view in elevation of one of the stretchable knitted fabric components employed in connection with the invention for carrying resin;

FIG. 2 is a view partly in section and partly in elevation of another non-stretchable skin component employed in connection with the invention;

FIG. 3 is a view in elevation of the inflatable mandrel with the knitted fabric applied thereto;

FIG. 4 is a vertical sectional view showing the resin applying step in the formation of the tubular object;

FIG. 5 is a horizontal sectional view taken approximately on the line 5—5 of FIG. 6 and showing further steps in the production of the tubular object;

FIG. 6 is a vertical sectional view taken approximately on the line 6—6 of FIG. 5;

FIG. 7 is a view partly in elevation and partly in section showing a tubular object in accordance with the invention;

FIG. 8 is an enlarged fragmentary sectional view of a portion of the wall of a tubular object in accordance with the invention, and FIG. 9 is a view similar to FIG. 8 showing another construction.

It should, of course, be understood that the description and drawings herein are illustrative merely, and that various skin compositions, modifications and changes can be made in the structure and methods disclosed without departing from the spirit of the invention.

Like numerals refer to like parts throughout the several views.

DESCRIPTION OF PREFERRED EMBODIMENTS

Referring now more particularly to FIGS. 7, 8 and 9 of the drawings, a continuous integral rigid hollow tubular article 10 in accordance with the invention is there illustrated and includes an end section 10a, a curved intermediate section 10b with its axis curved or angled and in a plurality of planes from which an end section 10c extends preferably relatively straight and open ended if desired. While the sections 10a, b and c are generally circular cylindrical and of varying transverse cross section as required for a particular end use the longitudinal axis is usually a tortuous line in a multiplicity of planes.

The shape shown in FIG. 7 is merely illustrative of various complexly curved tubular objects and other objects which can be made in the practice of the invention.

The mode of making the tubular article 10 will now be pointed out.

Referring now to FIG. 1 of the drawings, one of the components of the invention is illustrated at 15, and preferably consists of a continuous seamless knitted tubular fabric, closed ended if desired, preferably rib-knit, so as to be circumferentially expansible and upon expansion free from any tendency to thin out appreciably. While the extent of circumferential expansibility of the knitted tube 15 can be varied, the expansibility is preferably of an order up to about 800%. Any suitable materials for this purpose can be employed, dependent on the degree of heat resistance required. For normal low temperature ranges of the order of 250° F., and suitable for many automotive conduits, cotton or rayon, and nylon, Dacron, or other thermoplastic yarns can be employed for the making of the knitted tube 15.

If a higher order of temperature resistance is required, say up to 500° F., it is preferred that the knitted tube 15 be made of yarns of glass fibers or asbestos.

It is also feasible to use yarns having mixtures of the filamentary materials referred to, or strands of different materials can be employed on different carriers, or needles, in knitting the fabric.

For certain purposes, also a plurality of knitted tubes 15, each with the yarns of different materials can be employed as herein after explained. The texture of such knitted tubes 15 can be varied, if desired, and as hereinafter explained.

An inflatable flexible cylindrical core tube 16 is provided, closed at one end 16a (see FIG. 3) and at the other end has a valved inlet connection 17. The core tube 16 is preferably of rubber, natural or synthetic, and of a thickness of the type ordinarily used for inner tubes for tires of automotive vehicles. The core tube 16, in substantially deflated condition, is inserted lengthwise within a plurality of knitted tubes 15 as shown in FIG. 3. At this time, if desired, a partial inflation of the core tube 16 can be effected, but this is not usually required.

If a smoother interior of the tubular article 10 is desired a more finely knitted tube 15 having a larger number of wales and courses can be interposed between the core tube 16 and the outer knitted tube 15.

The core tube 16 with one or more knitted tubes 15 thereon is then dipped into a suitable liquid resin 18, in a receptacle 19, so that the knitted tubes 15 can be covered with and carry the liquid resin 18.

The resin 18 can be of any suitable type, is preferably of the thermosetting type, and can be a phenolic resin, a silicone resin, or a polyester resin, with suitable catalysts and curing agents incorporated therein and of suitable viscosity for application to the knitted tubes 15 and for subsequent treatment, and can be such as are described in the Sipler U.S. Pat. Nos. 2,990,855 and 2,995,781.

The liquid resin, preferably just before application to the knitted tubes 15, preferably has incorporated therein a suitable accelerator and for this purpose 11.25 parts by weight or about 2.25% of the resin of cobalt naphthenate has been found satisfactory. A suitable catalyst is preferably also incorporated at the same time and for this purpose 1 to 1½% by weight of 60% methyl ehtyl ketone peroxide in dimethyl phthalate has been found satisfactory.

In order to determine the exterior shape of the tubular article 10 a mold is provided and while any preferred form of mold can be employed, as shown in FIGS. 5 and 6 it is preferred to use a metallic mold of two or more separate parts 20 and 20a having an interior cavity 21 of the desired shape to be provided on the finished article. The interior cavity 21 can be cast therein by employing a master or pattern (not shown) and the surface thereof does not require any high quality finish.

A liner 25 can be placed in the interior cavity which is to provide the outer lamina or skin of the finished tubular article 10 and this material is selected in accordance with the results desired.

The liner 25 can be a material which is normally not subject to stretch but can be separately bent or shaped to conform to the shape of the mold cavity 21 either prior to or during the molding operation.

The liner 25, in one or more parts, can cover part or all of the interior of the mold cavity 21.

One suitable material for the mold liner 25 is metal foil, such as flexible aluminum foil of a thickness of 1 mil. If such foil is used it is advisable to roughen it such as by pre-pressing the contact side of the foil against a rough surface such as that of No. 80 coarse sandpaper. Any slight penetration which occurs facilitates gas release therethrough during molding and curing.

Another suitable material for the mold liner 25 is metal mesh, which is essentially open but relatively stiff, preferably of aluminum and which may be of a thickness of three sixteenths of an inch, such as is used in air conditioning filters.

Another suitable material for the mold liner 25 is an open or closed pore foam system, which may be a polymer such as polyethylene or polyurethane or which may be primarily inorganic in composition, such as a ceramic material. Such liners may be cast, molded or preshaped in accordance with their characteristics prior to their use in connection with the invention.

The mold liner 25 preferably preshaped to conform to the mold cavity 21 can be applied over the exterior of the resin saturated tube 15 on the mandrel 16 but is preferably inserted into the mold cavity and can be adhered to the interior cavity 21 of the mold 20, prior to insertion of the tube 15 and mandrel 16, by a gel coat previously applied to all or parts of the cavity 21 and allowed to become tacky so that the liner 25 readily adheres thereto. This facilitates the assembly for further treatment.

After assembly of the tube 15, and mandrel 16 within the liner 25 in the mold cavity 21, the mold 20 is closed and clamped in closed position.

The core tube 16 is then inflated to apply an internal pressure which may be of the order of 50 p.s.i. The application of the pressure by the core tube 16 causes the fabric of the knitted tubes 15 to expand radially and circumferentially and to shape itself to the shape determined by the shape of cavity 21. At the same time the liquid resin is caused to impregnate the interstices between the yarns of the knitted tube or tubes 15 and the interstices between the fibers of the yarn and engage the interior of the liner 25, excess resin escaping at the mold lines.

If the cavity liner 25 is of metal mesh the resin may also fill the interstices thereof.

If the cavity liner 25 is of a foam system the resin will still be adherent thereto and such a liner 25 will impart sound deadening and heat insulation properties.

The article can then be heat cured in the mold 20 or can be removed from the mold 20 and oven cured for approximately 1 hour at 175° F. or as required by the particular resin which is employed.

The article 10 is then permitted to cool and is ready for use, the cavity liner 25 now providing an outer lamina or skin on the article 10. If the skin is of metal foil or metal mesh the resistance of the metal can be employed for electrical resistance heating. A tubular article of this nature as a conduit is useful for preheating air passing therethrough from an air cleaner to a carburetor of an automotive vehicle such as a truck, or can be used to heat fluids passing through a tubular conduit for other purposes.

The metallic lamina as heretofore described is also useful for heat reflection and heat diffusion.

A tubular duct with a metallic lamina, such as of aluminum as heretofore described provides better infrared reflectivity so that if the duct is close to hot metal parts the air passing therethrough is not as greatly affected by the external heat sources and variations of their heat output. The metallic lamina in addition to its action as a reflector also tends to conduct heat away from an exterior hot spot thereby avoiding injury to the duct by such a hot spot. The metal mesh is more effective in this respect than the foil.

The articles heretofore described have greater tensile strength than such articles heretofore available and high resistance to delamination.

The completed tubular conduit 10 can be buffed if needed and the flash removed. No other finishing operation is required but the tubular conduit 10 is then ready for use.

The tubular article 10 made as herein set forth can be readily provided with the desired permanent tortuous shape, if rigid and strong, free from porosity, light in weight, resistant to high and low temperatures, and is inert and free from likelihood of damage particularly in automotive applications and has other advantageous characteristics which were not heretofore available.

I claim:
1. In a monolithic tubular article comprising
    a light weight non-metallic rigid tubular body having a varying cross section between its ends and a fixed tortuous non-planar longitudinal axis between its ends and a plurality of interior circumferentially expanded tubular continuous seamless knitted fabrics conforming to the shape of the surface of the body and surrounded by and impregnated with an integral rigid cured resin the improvement which comprises
    an outer lamina modifying the action of the exterior surface of the body consisting of a single layer held in secured relation to the body by the resin of the body and extending over a selected limited part of the exterior of the body.
2. A tubular article as defined in claim 1 in which said lamina is metallic.
3. A tubular article as defined in claim 2 in which said metallic lamina is a reflective foil.
4. A tubular article as defined in claim 3 in which said foil is aluminum foil.
5. A tubular article as defined in claim 2 in which said metallic lamina is metallic mesh.
6. A tubular article as defined in claim 5 in which said metallic mesh is of aluminum.
7. A tubular article as defined in claim 1 in which
    said outer lamina is a body resin attached and retained foam layer.
8. A tubular article as defined in claim 7 in which
    said foam layer is primarily a body resin attached and retained organic foam layer.
9. A tubular article as defined in claim 7 in which
    said foam layer is primarily a body resin attached and retained inorganic foam layer.

* * * * *